United States Patent
An et al.

(10) Patent No.: US 7,885,846 B2
(45) Date of Patent: Feb. 8, 2011

(54) METHOD AND SYSTEM FOR PLANNING OF SERVICES WORKFORCE STAFFING USING HIRING, CONTRACTING AND CROSS-TRAINING

(75) Inventors: Lianjun An, Yorktown Heights, NY (US); Dharmashankar Subramanian, Tarrytown, NY (US)

(73) Assignee: International Business Machines Incorporated, Armonk, NY (US)

(*) Notice: Subject to any disclaimer, the term of this patent is extended or adjusted under 35 U.S.C. 154(b) by 416 days.

(21) Appl. No.: 12/015,203

(22) Filed: Jan. 16, 2008

(65) Prior Publication Data
US 2009/0182598 A1    Jul. 16, 2009

(51) Int. Cl.
*G05B 19/418* (2006.01)
(52) U.S. Cl. ............... 705/8; 705/7; 705/9; 705/10; 705/1
(58) Field of Classification Search .......... 705/1, 705/8, 7, 10
See application file for complete search history.

(56) References Cited

U.S. PATENT DOCUMENTS

| | | | | |
|---|---|---|---|---|
| 6,072,493 | A * | 6/2000 | Driskell et al. | 715/854 |
| 6,574,605 | B1 * | 6/2003 | Sanders et al. | 705/8 |
| 6,611,726 | B1 * | 8/2003 | Crosswhite | 700/99 |
| 6,985,872 | B2 * | 1/2006 | Benbassat et al. | 705/8 |
| 2002/0055870 | A1 * | 5/2002 | Thomas | 705/10 |
| 2002/0087377 | A1 * | 7/2002 | Rajasenan et al. | 705/7 |
| 2003/0033184 | A1 * | 2/2003 | Benbassat et al. | 705/8 |
| 2003/0105656 | A1 * | 6/2003 | Thengvall et al. | 705/8 |
| 2004/0162753 | A1 * | 8/2004 | Vogel et al. | 705/10 |
| 2006/0031110 | A1 * | 2/2006 | Benbassat et al. | 705/9 |
| 2008/0162246 | A1 * | 7/2008 | Chen-Ritzo et al. | 705/9 |

OTHER PUBLICATIONS

Yu et al.; Optimizing Pilot Planning and Training for Continental Airlines; Interfaces; Jul./Aug. 2004; 34, 4; ABI/INFORM Global; p. 253-264.*
Yu et al.; A new era for crew recovery at Continental Airlines; Interfaces; Jan./Feb. 2003; 33, 1; ABI/INFORM Global p. 5-22.*

* cited by examiner

*Primary Examiner*—Kambiz Abdi
*Assistant Examiner*—Sarah M Monfeldt
(74) *Attorney, Agent, or Firm*—Scully, Scott, Murphy & Presser, P.C.; Stephen C. Kaufman, Esq.

(57) ABSTRACT

A method and system for workforce planning in one aspect provide an optimization model that produce, based on the availability profile and the demand profile of skill types, a workforce plan recommending a combination of actions. The combination of actions may include hiring, contracting and cross-training. The optimization model considers constraints such as minimum residence time that a resource unit needs to spend in a skill-type that it gets cross-trained into or hired into, minimum acceptable contracting duration for a contracted skill type, first order and higher orders of cross-training for a skill type, with lead-time for training, one or more system rules associated with transfer sequences, or targets on service levels and resource utilization, or combinations thereof, in determining the workforce plan.

20 Claims, 2 Drawing Sheets

Ford (1) METHOD AND SYSTEM FOR PLANNING OF SERVICES WORKFORCE STAFFING USING HIRING, CONTRACTING AND CROSS-TRAINING

FIELD OF THE INVENTION

The present application generally relates to optimization of workforce staffing, and more particularly to creating a hiring, cross-training and contracting plan based on the forecasted demand and an available workforce outlook of multiple skills.

BACKGROUND OF THE INVENTION

In service areas or businesses, firms have an available pool of several skill-types. That is, there are resources (typically human resources) with different types of skills. Firms have the option of cross-training a chosen number of resources from any primary skill type into secondary skills, tertiary skills, and so on. They also have the option of further hiring and increasing the system availability of any chosen skill type. In addition, they also have the option of contracting out a required amount of any chosen skill type. Given an estimate of the time-indexed demand profile for each skill type, possibly aggregated over multiple projects, firms need to plan ahead in order to determine the extent of hiring, cross-training, and contracting, so that they are well positioned to meet the actual demand that will be realized.

Existing solutions do not consider the above sets of staffing options in totality. Therefore, it would be desirable to have a system and method that provides such workforce plans. It would also be desirable if the system and method took into account operational constraints like the minimum residence time that a resource-unit needs to spend in any skill-type upon being cross-trained and/or hired, minimum acceptable duration of any contracted skill set, inter-skill cross-training costs and lead time, and the uncertainties associated with the demand profile.

BRIEF SUMMARY OF THE INVENTION

A method and system for planning of services workforce staffing are provided. The method, in one aspect, may comprise collecting an availability profile for each skill type; collecting a demand profile for each skill type, and establishing a workforce plan using an optimization model, the workforce plan recommending a combination of actions based at least on the availability profile and the demand profile. The combination of actions may include at least hiring, contracting and cross-training.

A system for planning of services workforce staffing, in one aspect, may comprise a computer-implemented collection module operable to collect availability profile for each skill type and a computer-implemented forecast module operable to develop a forecasted estimate of time-indexed demand profile for said each skill type. A computer-implemented optimization module is operable to receive the availability profile for each skill type and the time-indexed demand profile for each skill type, and to establish a workforce plan recommending a combination of actions based at least on the availability profile and the time-indexed demand profile. The combination of actions may include at least hiring, contracting and cross-training. The optimization module further uses constraints such as minimum residence time that a resource unit needs to spend in a skill-type that it gets cross-trained into or hired into, minimum acceptable contracting duration for a contracted skill type, first order and higher orders of cross-training for a skill type, with lead-time for training, one or more system rules associated with transfer sequences, or targets on service levels and resource utilization, or combinations thereof, in determining the workforce plan.

A program storage device readable by a machine, tangibly embodying a program of instructions executable by the machine to perform the above methods may be also provided.

Further features as well as the structure and operation of various embodiments are described in detail below with reference to the accompanying drawings. In the drawings, like reference numbers indicate identical or functionally similar elements.

DETAILED DESCRIPTION

A system and method of the present disclosure in one embodiment solve a multi-period optimization problem, posed over a novel workforce staffing model that captures various problem constraints and objectives for planning of services workforce. The model allows the enterprise, firm, or business or like, to consider a flexible set of options including hiring, cross-training, and contracting.

Figure 1:
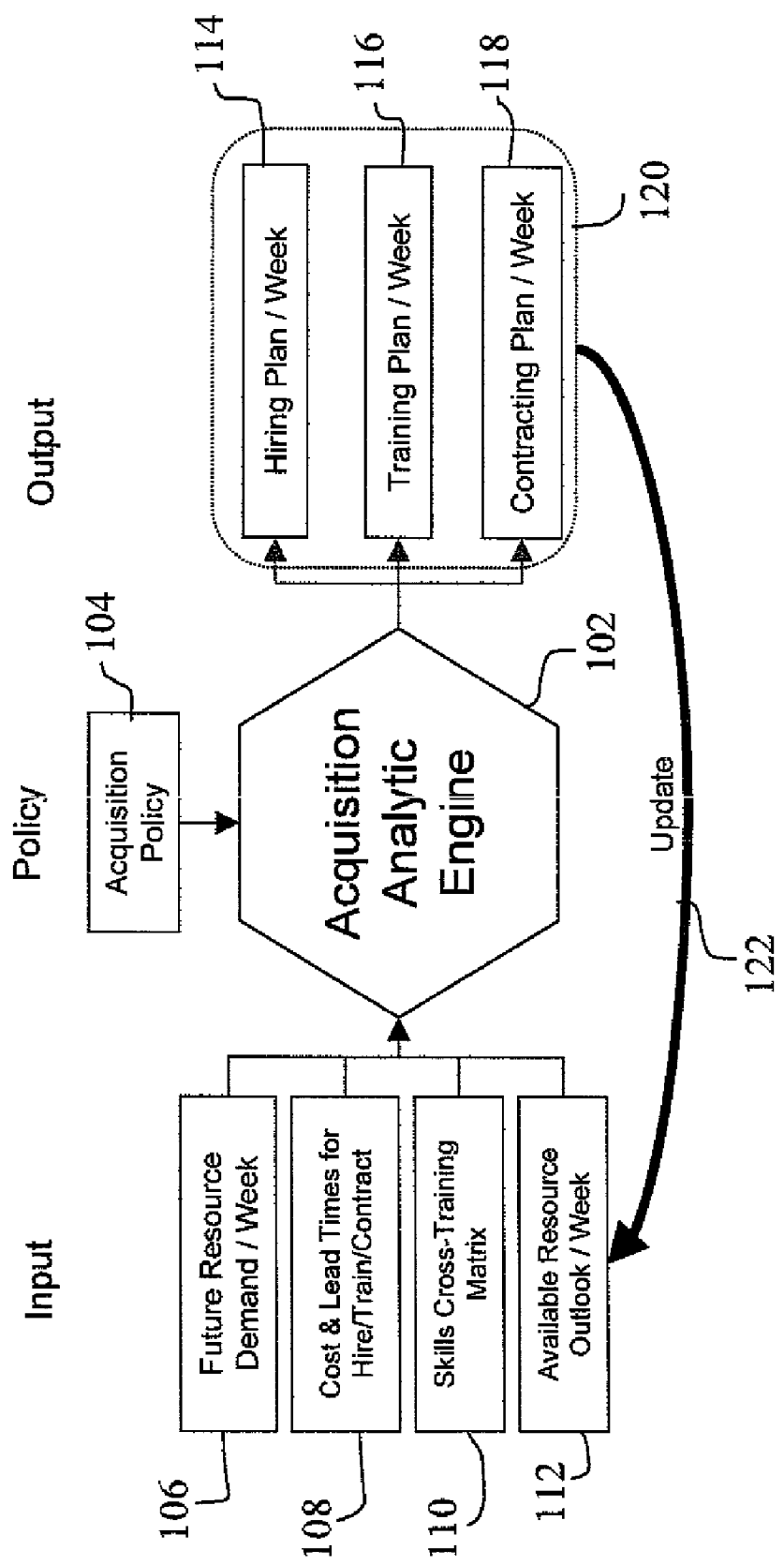
FIG. 1 is a diagram illustrating components in one embodiment for producing and optimizing workforce plan.

FIG. 1 is a diagram illustrating components in one embodiment for producing and optimizing workforce plan. The system and method in one embodiment creates a hiring 114, cross-training 116 and contracting plan 118 based on the forecasted demand 106 and an available workforce outlook of multiple skills 112. An optimized plan 120 may be formed also using information of hiring, training and contracting cost and lead time 108 and matching matrix across skills 110 as well as the specified operation requirements and/or policies 104. A workforce manager can execute the resulting plan and achieve efficient results. The plan fills the gap (shortage) between demand and available service force, and at the same time, reduces the glut (surplus) for achieving better utilization.

FIG. 1 shows a staffing model in one embodiment that is created that considers hiring, cross-training and contracting, with costs. In one embodiment, information associated with hiring, cross-training and contracting cost and lead time for considered skills 108 is collected, and training matrix whose entries quantify the possibility of training from skill A to B 110 is specified. A program logic or optimization procedure referred to in FIG. 1 as an acquisition analytic engine 102 receives as input, inter alia, the collected information and the specified matrix 110. An acquisition analytic engine 102 generates how many workers with certain skill should be hired or contracted or trained for other skill or skills (114, 116, 118) to reduce glut and fill gap.

In one embodiment, one or more operational parameters are provided as constraints to the model. In one embodiment, Acquisition Policy module or like 104 provides those operational parameters and/or business rules that may logically constrain or provide criteria for hiring, cross-training, and/or contracting plans. Examples of the constraint parameters may include, but are not limited to, minimum residence time that any resource unit needs to spend in any skill-type that it gets cross-trained into, or hired into; minimum acceptable contracting duration for any contracted skill type; first order and higher orders of cross-training for any skill type, with leadtime that is necessary for training; system rules on permissible transfers, i.e., logical restrictions on cross-training transfers from one skill set to another. An example of logical restrictions is as follows. In a given system, for any primary skill type, i, which is currently active on any skill type, j, (possibly, j=i), if the skill type is being cross-trained out of type, j, into another skill type, then no transfer is allowed into skill type, j, for at least a certain minimum time interval. Similarly, if any skill type, is being cross-trained into skill type, j, no transfer out of skill type, j, is allowed for a certain minimum time interval. Addition constraints may include, but are not limited to, targets on service levels and resource utilization. Such targets specify the extent of the available workforce actively engaged on projects/work. At any given point in time, some of the workforce is active on real work, while the rest are "on the bench", i.e., idle. Resource utilization measures the ratio of actively engaged workforce to the total workforce. For example, if out of 100 units in a given skill type, at any given point in time, 90 units are actively engaged on projects, and 10 units are idle, then the Resource Utilization of this skill type is 90%. Further constraints may include, but are not limited to, multiple objectives such as gap minimization, glut minimization, cost minimization with demand fulfillment constraints, and weighted combinations of the above. A weighted combination can be a weighted sum of each of the above individual "objectives" or constraints. The model also provides for a stochastic extension for a risk-measure on gap, or glut, due to uncertainties in the demand profile. Stochastic Extension refers to the case where the forecasted demand profile in time is not a point-value estimate, but a distribution of values with respective probabilities, in the form of a probability distribution.

Given a base availability profile for each skill type (discrete-time) 112 and aggregated (over all projects) demand profile for each skill set 106, the model provides various decisions or options including, for example, whether to hire, contract, or cross-train between skill types, each with its own cost structure 120. Operational constraints, cross-training lead-times and costs on allowable pairs of skills, minimum residence time in any skill set, minimum acceptable contract duration, and rules on allowable transfers, etc. may be considered in the optimization model for making the workforce planning decisions.

In one embodiment, the model takes into account a plurality of objectives in its optimization procedure. For instance, objectives such as minimizing the total cost resulting from accumulated gaps and gluts for each skill type, as well as hiring, contracting and cross-training costs, and using an optimal sequence of the above-described choices of control actions (of Hire, Cross-train, Contract from an outsourcing firm) are considered. The data from the resulting plan 120 may be fed back as part of an input as shown at 122 for further optimization.

Figure 2:
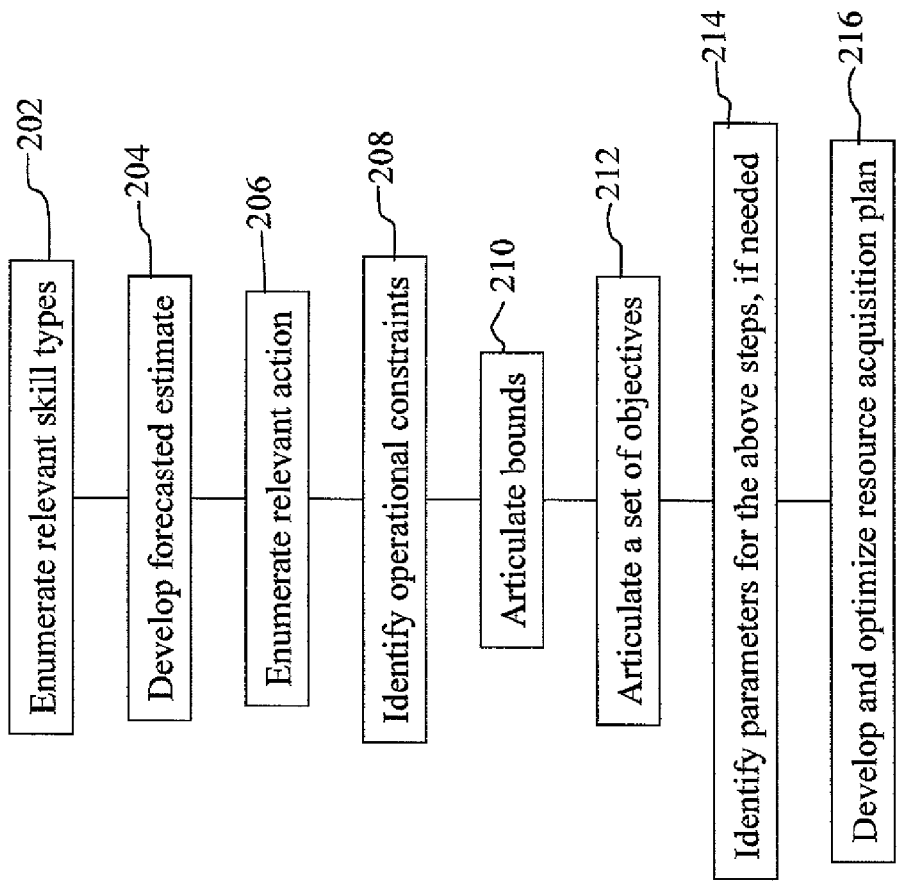
FIG. 2 is a flow diagram illustrating an optimization methodology for producing a workforce plan in one embodiment of the present disclosure.

FIG. 2 is a flow diagram illustrating an optimization methodology for producing a workforce plan in one embodiment of the present disclosure. At 202, all relevant skill types are enumerated. At 204, develop a forecasted estimate of the time-indexed demand profile for each skill type, possibly aggregated over projects. The time-resolution could be any chosen or appropriate resolution that makes sense for the planning problem. Examples of the time-resolution include, but are not limited to, Week, Month, Quarter, etc. At 206, enumerate all the relevant actions. Relevant actions may include Hire, Cross-Train, and/or Contract. Costs are also identified, for example, the hiring cost for each skill type, cross-training costs for those pairs of skill types that are cross-trainable, and contracting cost for each skill type. At 208, operational constraints are identified. As explained above, examples of operational constraints may include, but are not limited to, cross-training lead time on relevant cross-trainable pairs of skill-types, the minimum residence time that must be spent by any resource unit in any skill-type into which it gets either hired into, or cross-trained into, minimum acceptable contracting period for any skill-type, any additional rules and/or constraints that may be applicable to define the space of allowable for cross-training related transfers from one skill type to another.

At 210, bounds are articulated, if needed or desired. Bounds may be on Customer Service Level, and/or on Resource Utilization, for each skill type. At 212, a set of objectives is articulated. The objectives specify what the resource acquisition plan should optimize. An example of objectives may include, but is limited to, overall cost minimization. At 214, identify, if needed, the parameters covered in steps 202-212, that may have uncertain values, and characterize those parameters as probability distributions. For example, a forecasted demand profile may be uncertain, and hence characterized in the form of a probability distribution, instead of a deterministic point-estimate. At 216, using the above steps, develop an optimal Resource Acquisition Plan.

In the context of cross-training, for example, used in step 206, that is, to determine whether or whom to cross-train into what skill types, first order and higher order transfers are defined while keeping track of the primary skills associated with each resource. First order transfer refers to transfer of primary skill type i to skill type j, that is, a resource whose primary skill includes type i is trained for skill type j, where skill type i is not equal to skill type j. Higher order transfer refers to transfer of primary skill type i, from skill type j≠i, where it is currently active, and to skill type, k≠j. That is, a resource with primary skill type i, and skill type j currently working in the capacity of skill type j is trained into skill type k, where i, j and k are different skill types.

In one embodiment of the present disclosure, S (i, j, k, t) is used as a variable that models the first order and higher order transfers, where: S (i, j, k, t) is the number of units of primary skill type i, which are currently active on skill type j, and which are being transferred into training, for a move from skill type j to skill type k, at time t. When j=i, this variable models a first order transfer.

In one embodiment of the method, only the primary skill type information is tracked across multiple transfers. For example, a unit of skill type A (primary skill is A) is transferred from its primary skill, A, to a secondary skill B, where it stays, for instance, for two months. After the two months of stay, it gets transferred into another skill C, and later to D, and so on. It should be noted that its primary skill identity, i.e., type A, is tracked throughout, regardless of which skill type it may be currently active on, for example, B, C, D, etc. In this embodiment, the history of skill types it may have visited is not tracked. In other words, what is not tracked is the sequence A→B→C→D→.... Each cross-training transfer of any unit, other than a transfer to its own primary skill type, incurs a training cost and lead-time.

In another embodiment, if the entire path-history across skill types needs to be tracked, then the model can be extended to model each individual unit of resource, separately. If the history of sequence is tracked, then one may model the case that if a particular skill type has been experienced in the past, then it may be re-used without incurring any additional Training Costs/Lead time. For example, in A→B→C→D→E→C example, a unit of primary skill type A, gets sequentially cross-trained into B, C, D, F, and then into C. If the history of the sequence (A, B, C, D, E, and then into C) is tracked, then one may model the case that since skill set C was experienced in the past, there is no cross-training cost and/or lead-time associated with the last transfer from E→C. When only the primary skill type is tracked, the history of past cross-training transfers is not tracked. A novel mathematical model is utilized, for instance, for step 216, to implement the optimization of training, hiring and contracting plan with higher order transfers. The objective function of the model may be as follows:

Objective: find $S_{ijkt}$, $H_{it}$, $U_{it}$ and $F_{it}$ such that $$\min\left\{\sum_{i,t} p_i \cdot q^{\left[\frac{t}{w}\right]}\left[\omega_1 G_{it}^+ + \omega_2 G_{it}^- + \right.\right.$$

$$\omega_3 \sum_j \sum_{k \neq j} S_{ijkt} \min_{i,j}(\Delta_{ik}, \Delta_{jk}) c_{\arg\min(\Delta_{ik}, \Delta_{jk}), k} +$$

$$\left.\left. H_{i,t} c_i^h + \sum_{\tau=1}^{t} (U_{i\tau} - F_{i\tau}) c_i^u \right]\right\}$$

where,
$S_{ijkt}$: Units of primary skill, i, which are currently active in j, for training into k, at time t
$H_{i,t}$: Units of primary skill, i, hired in time period, t
$U_{i,t}$: Units of primary skill, i, contracted in time period, t
$F_{i,t}$: Units of contracted primary skill, i, let go, in time period, t
$c_i^h$: Hiring cost per unit of primary skill, i
$c_i^u$: Contracting cost per unit of primary skill, i, per unit time
$G_{it}^+$: Gap of skill i at period t
$G_{it}^-$: Glut of skill i at period t
$c_{ij}$: Training cost from i to j per person per period
$\Delta_{ij}$: Training lead time from i to j
$\omega_k$: Weight for gap, glut and training cost
$p_i$: Priority order of different skills
q: Time discount factor (w discount window)

The above objective function (minimization function) includes a skill-type prioritized, weighted sum of the time-discounted costs resulting from skill type Gaps (Demanded amount is larger than what is available), Gluts (What is available is larger than what is demanded), sum total of all cross-training time-discounted costs, sum total of all hiring time-discounted costs, and sum total of all contracting time-discounted costs. Different priorities for different skill sets allows for valuing the cost corresponding to the different skill types differently. In the above model, hiring cost is on the basis of per-unit of skill type i, and contracting cost is on the basis of per-unit of skill type i, per unit time of the contract.

The above objective function is evaluated in the context of the following constraints and bounds in one embodiment:

Constraint Family 1: Real Availability Constraint.

$$RA_{i,t} = A_{i,t} + \sum_j \sum_{k \neq i} \sum_{\tau=1}^{t} S_{j,k,i,\tau-\min(\Delta_{ji},\Delta_{ki})} -$$

$$\sum_j \sum_{k \neq i} \sum_{\tau=1}^{t} S_{j,i,k,\tau} + \sum_{\tau=1}^{t} H_{i,\tau} + \sum_{\tau=1}^{t} U_{i,\tau} - \sum_{\tau=1}^{t} F_{i,\tau} \; RA_{i,t} \geq 0$$

Where, the first term is base availability; second term is accumulated sum over first and higher order transfers into skill type i; third term is accumulated sum over first and higher order transfers out of skill type i; fourth, fifth, and sixth terms model the accumulated sums of hiring, contracting-in, and contracting-out. This constraint effectively calculates, RA(i,t), which is the net, real availability of the number of skill-units, of type, i, that can address demand for any type, i, and in any given time period, t. The real availability of the number of skill-units in any given skill-type, and in any given time period, depends on the initial count, and the cumulative effect of various hiring decisions, contracting decisions and cross-training decisions, into the skill type, as well as out-of-the skill type, until the given time period. The above constraint systematically captures all these inflows and outflows.

Constraint Family 2: Physical Bounds on Transfers.

$$\sum_{k \neq i} S_{j,i,k,t} \leq$$

$$\left(A_{i,t} + \sum_{\tau=1}^{t} H_{i,\tau-R_i}\right)\delta_{ij} + \sum_{k \neq i} \sum_{\tau=1}^{t} S_{j,k,i,\tau-\min(\Delta_{ji},\Delta_{ki})-R_i} - \sum_{k \neq i} \sum_{\tau=1}^{t-1} S_{j,i,k,\tau}$$

$\delta_{ij}$: Delta function $S_{i,j,k,t} \geq 0, \; S_{i,j,j,t} = 0.$

Where, the first term is base availability+accumulated hired availability. This is pertinent only for bounds on first order transfer (hence, delta function usage). The second term is accumulated sum over first and higher order transfers into skill type i; third term is accumulated sum over first and higher order transfers out of skill type i; $R_i$ is minimum residence time for any skill type that gets transferred into skill i, from any skill j≠i, and gets hired into skill i. The above constraint ensures that the cross-training related outflows from any given skill type, and in given time period, do not exceed the allowed number of skill-units that are available for cross-training outflow in that time period. Physical bounds on transfers are examples of bounds that can be articulated at step 210.

Constraint Family 3: System Rules on Permissible Transfers.

$$\sum_j \sum_{k \neq i} \sum_{\tau=t-R_i}^{t} S_{j,k,i,\tau-\min(\Delta_{ji},\Delta_{ki})} \leq L * Zin_{i,t}$$

$$\sum_j \sum_{k \neq i} S_{j,i,k,t} \leq L * (1 - Zin_{i,t})$$

$$\sum_j \sum_{k \neq i} \sum_{\tau=t-R_i}^{t} S_{j,i,k,\tau} \leq L * Zout_{i,t}$$

$$\sum_j \sum_{k \neq i} S_{j,k,i,t} \leq L * (1 - Zout_{i,t})$$

For any primary skill type i (that is, a resource such as an employee whose primary skill is of type i), which is currently active on any skill type j (that is, the resource is currently working in a job category of skill type j), and where j is possibly equal to i, the following system rules may be employed as constraints on permissible transfer as expressed by the above equation. If the skill type is being cross-trained out of type j, into another skill type, then no transfer is allowed into skill type j, for at least a certain minimum time interval.

Similarly, if any skill type, is being cross-trained into skill type j, no transfer out of skill type j, is allowed for a certain minimum time interval.

In the above system rule constraint expression, Zin(i,t) is a binary variable (e.g., 0 or 1 logical variable) that takes on a value of 1:
- if any cross-training transfer has been made into skill type, i, in any of the time-periods up to Ri time periods, prior to time period, t, and
- 0, otherwise.

The logical permissibility in the above expression is: Ri is the minimum time interval for which there should be no cross-training transfers out of skill type, i, if there are any transfers into skill type, i. The first two inequalities in the above constraint expression model this logical permissibility. Note that when Zin(i,t) takes on a value of 1, as required by the first inequality, the second inequality will not allow any cross-training transfers out of skill type, i, since the Right Hand Side become zero.

Similarly, Zout (i,t) is a binary variable that that takes on a value of 1:
- if any cross-training transfer has been made out of skill type, i, in any of the time-periods up to Ri time periods, prior to time period, t, and
- 0, otherwise.

The logical permissibility is: Ri is the minimum time interval for which there should be no cross-training transfers into skill type, i, if there are any transfers out of skill type, i. The last two inequalities in the above expression model this logical permissibility. When Zout(i,t) takes on a value of 1, as required by the first inequality, the second inequality will not allow any cross-training transfers into skill type, i, since the Right Hand Side become zero. The term, L, is an upper bound on the total number of cross-training related skill-unit transfers that can be made into, or out of, any given skill type, and in any given time-period.

Constraint Family 4: Physical Bounds on Outgoing Contracted Units.

$$F_{i,t} \leq \sum_{\tau=1}^{t} U_{i,\tau-R_i} - \sum_{\tau=1}^{t-1} F_{i,\tau}$$

$$F_{i,t} \geq 0, U_{i,t} \geq 0$$

Lastly, Gap and Glut are non-negative $$G_{i,t}^+ \geq 0, G_{i,t}^- \geq 0, \text{ and}$$

$$G_{i,t}^+ - G_{i,t}^- = D_{i,t} - RA_{i,t}$$

Where, the first term is accumulated contracted availability, until $R_i$ units of time, before current time and the second term is accumulated out-flows of contracted units, until the previous time period. The first inequality in the above expression ensures that the outflows in the contracted skill-units in any given skill type, and in any given time period, do not exceed the net availability of contracted skill-units in that time period.

Constraint Family 5: User-Bounds on System Performance.

$$\sum_t G_{i,t}^+ \leq (1 - CSL) * \sum_t D_{i,t}$$

$$\sum_t G_{i,t}^- \leq (1 - Util) * \sum_t RA_{i,t}$$

The above inequalities ensure that sufficient system performance is guaranteed, in terms of Customer Service Level (CSL), as well as Utilization Percentage (Util). These system performance metrics can be expressed in terms of the Gaps, Gluts, Real Availability and Demand, as shown above. User-defined bounds on performance with respect to customer Service Level can be defined as a Gap, relative to Demand. User-defined bounds on performance with respect to Resource Utilization can be defined as a Glut, relative to Real Availability.

Constraint Family 6: Extension to Stochastic Formulation $$CVAR_{\beta_{i,t}}(G_{i,t}^+) \leq \epsilon_t$$

if desired, $\epsilon_t$ can become larger with time (Less strict about future gaps).

Similarly, $\beta_{i,t}$ can become smaller with time $CVAR_\beta$ is the conditional-value-at-risk, at confidence level, $\beta$ CVAR is a convex risk measure, and we have efficient algorithms to handle CVAR constraints.

If the demand profile is uncertain, for example, as identified in step 214, the system and method of the present disclosure in one embodiment extend the linear programming formulation to include probabilistic constraints of the above form. If the demand profile is uncertain, then, the Gap variable, which tracks the positive difference between how much is demanded and how much is available, becomes a random variable. In this case, the Customer Service Level metric of system performance, which is tracked by the Gap variable becomes a random variable. If it is sought to bound the system performance, then only a probabilistic bound is possible. The method of the present disclosure in one embodiment uses a probabilistic bound in the form of a risk measure, known as Conditional Value at Risk, which is a convex risk measure. This risk measure can be applied to the Gap variable, which is a random variable in the stochastic case of uncertain demands.

The system and method of the present disclosure may be implemented and run on a general-purpose computer or computer system or a special-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for planning of services workforce staffing, comprising:
    collecting an availability profile for each skill type;
    collecting a demand profile for each skill type; and
    establishing, by a processor, a workforce plan using an optimization model, the workforce plan recommending a combination of actions, said combination of actions including at least hiring, contracting and cross-training, based on the availability profile and the demand profile,
    wherein the optimization model includes a function, find $S_{ijkt}$, $H_{it}$, $U_{it}$ and $F_{it}$ such that $$\min\left\{\sum_{i,t} p_i \cdot q^{\left[\frac{t}{w}\right]}\left[\omega_1 G_{it}^+ + \omega_2 G_{it}^- + \omega_3 \sum_j \sum_{k\neq j} S_{ijkt} \min_{i,j}(\Delta_{ik}, \Delta_{jk}) c_{argmin(\Delta_{ik},\Delta_{jk}),k} + H_{i,t}c_i^h + \sum_{\tau=1}^{t}(U_{i\tau} - F_{i\tau})c_i^u\right]\right\}$$

Where,
    $S_{ijkt}$: Units of primary skill, i, which are currently active in j, for training into k, at time t
    $H_{i,t}$: Units of primary skill, i, hired in time period, t
    $U_{i,t}$: Units of primary skill, i, contracted in time period, t
    $F_{i,t}$: Units of contracted primary skill, i, let go, in time period, t
    $c_i^h$: Hiring cost per unit of primary skill, i
    $c_i^u$: Contracting cost per unit of primary skill, i, per unit time
    $G_{it}^+$: Gap of skill i at period t
    $G_{it}^-$: Glut of skill i at period t
    $c_{ij}$: Training cost from i to j per person per period
    $\Delta_{ij}$: Training lead time from i to j
    $\omega_k$: Weight for gap, glut and training cost
    $p_i$: Priority order of different skills
    q: Time discount factor (w discount window).

2. The method of claim 1, wherein the step of establishing further includes formulating said optimization model.

3. The method of claim 2, wherein the step of establishing further includes formulating said optimization model with constraints of:
    minimum residence time that a resource unit needs to spend in a skill-type that the resource unit gets cross-trained into, or hired into;
    minimum acceptable contracting duration for a contracted skill type;
    first order and higher orders of cross-training for a skill type, with lead-time for training;
    one or more system rules associated with transfer sequences; or
    targets on service levels and resource utilization; or combinations thereof.

4. The method of claim 3, wherein said constraints are input to said optimization model as weighted constraints.

5. The method of claim 1, further including:
    updating said demand profile for each skill type using said workforce plan established in the establishing step.

6. The method of claim 5, wherein said updated demand profile is further input to said optimization model for use in establishing an updated workforce plan.

7. The method of claim 1, wherein the step of collecting an availability profile for each skill type, includes:
    enumerating all relevant skill types that are available.

8. The method of claim 1, wherein the step of collecting a demand profile for each skill type includes:
    developing a forecasted estimate of time-indexed demand profile for said each skill type.

9. The method of claim 8, wherein said time-indexed demand profile is aggregated over a plurality of projects.

10. The method of claim 1, wherein said workforce plan is established for a predetermined time period.

11. The method of claim 1, further including:
    enumerating a plurality of relevant actions;
    identifying costs associated with said relevant actions; and
    using said relevant actions and associated costs in said establishing step as input to the optimization model.

12. The method of claim 10, wherein said relevant actions include hiring, cross-training, or contracting, or combinations thereof.

13. The method of claim 1, further including:
    using probabilistic bounds for an uncertainty in said demand profile.

14. A non-transitory program storage device readable by a machine, tangibly embodying a program of instructions executable by the machine to perform a method for planning of services workforce staffing, comprising:
    collecting an availability profile for each skill type;
    collecting a demand profile for each skill type; and
    establishing a workforce plan using an optimization model, the workforce plan recommending a combination of actions, said combination of actions including at least hiring, contracting and cross-training, based on the availability profile and the demand profile,
    wherein the optimization model includes a function, find $S_{ijkt}$, $H_{it}$, $U_{it}$ and $F_{it}$ such that $$\min\left\{\sum_{i,t} p_i \cdot q^{\left[\frac{t}{w}\right]}\left[\omega_1 G_{it}^+ + \omega_2 G_{it}^- + \omega_3 \sum_j \sum_{k\neq j} S_{ijkt} \min_{i,j}(\Delta_{ik}, \Delta_{jk}) c_{argmin(\Delta_{ik},\Delta_{jk}),k} + H_{i,t}c_i^h + \sum_{\tau=1}^{t}(U_{i\tau} - F_{i\tau})c_i^u\right]\right\}$$

Where,
    $S_{ijkt}$: Units of primary skill, i, which are currently active in j, for training into k, at time t
    $H_{i,t}$: Units of primary skill, i, hired in time period, t
    $U_{i,t}$: Units of primary skill, i, contracted in time period, t
    $F_{i,t}$: Units of contracted primary skill, i, let go, in time period, t
    $c_i^h$: Hiring cost per unit of primary skill, i $c_i^u$: Contracting cost per unit of primary skill, i, per unit time
$G_{it}^+$: Gap of skill i at period t
$G_{it}^-$: Glut of skill i at period t
$c_{ij}$: Training cost from i to j per person per period
$\Delta_{ij}$: Training lead time from i to j
$\omega_k$: Weight for gap, glut and training cost
$p_i$: Priority order of different skills
q: Time discount factor (w discount window).

15. The program storage device of claim 14, wherein the step of establishing further includes formulating said optimization model.

16. The program storage device of claim 14, wherein the step of establishing further includes formulating said optimization model with constraints of:
   minimum residence time that a resource unit needs to spend in a skill-type that it gets cross-trained into, or hired into;
   minimum acceptable contracting duration for a contracted skill type;
   first order and higher orders of cross-training for a skill type, with lead-time for training;
   one or more system rules associated with transfer sequences; or
   targets on service levels and resource utilization; or
   combinations thereof.

17. The program storage device of claim 16, wherein said constraints are input to said optimization model as weighted constraints.

18. The program storage device of claim 14, further including:
   updating said demand profile for each skill type using said workforce plan established in the establishing step.

19. The program storage device of claim 18, wherein said updated demand profile is further input to said optimization model for use in establishing an updated workforce plan.

20. A system for planning of services workforce staffing, comprising:
   a processor;
   a computer-implemented collection module operable to collect availability profile for each skill type;
   a computer-implemented forecast module operable to develop a forecasted estimate of time-indexed demand profile for said each skill type;
   a computer-implemented optimization module operable to receive the availability profile for each skill type and the time-indexed demand profile for each skill type, and to establish a workforce plan recommending a combination of actions, said combination of actions including at least hiring, contracting and cross-training, based on the availability profile and the time-indexed demand profile, said optimization module further using one or more constraints of minimum residence time that a resource unit needs to spend in a skill-type that it gets cross-trained into, or hired into, minimum acceptable contracting duration for a contracted skill type, first order and higher orders of cross-training for a skill type, with lead-time for training, one or more system rules associated with transfer sequences, or targets on service levels and resource utilization, or combinations thereof, in determining the workforce plan,
   wherein the optimization model includes a function, find $S_{ijkt}$, $H_{it}$, $U_{it}$ and $F_{it}$ such that $$\min\left\{\sum_{i,t} p_i \cdot q^{\left[\frac{t}{w}\right]}\left[\omega_1 G_{it}^+ + \omega_2 G_{it}^- + \omega_3 \sum_j \sum_{k\neq j} S_{ijkt}\min_{i,j}(\Delta_{ik}, \Delta_{jk})c_{argmin(\Delta_{ik},\Delta_{jk}),k} + H_{i,t}c_i^h + \sum_{r=1}^{t}(U_{i\tau} - F_{i\tau})c_i^u\right]\right\}$$

Where,
$S_{ijkt}$: Units of primary skill, i, which are currently active in j, for training into k, at time t
$H_{i,t}$: Units of primary skill, i, hired in time period, t
$U_{i,t}$: Units of primary skill, i, contracted in time period, t
$F_{i,t}$: Units of contracted primary skill, i, let go, in time period, t
$c_i^h$: Hiring cost per unit of primary skill, i
$c_i^u$: Contracting cost per unit of primary skill, i, per unit time
$G_{it}^+$: Gap of skill i at period t
$G_{it}^-$: Glut of skill i at period t
$c_{ij}$: Training cost from i to j per person per period
$\Delta_{ij}$: Training lead time from i to j
$\omega_k$: Weight for gap, glut and training cost
$p_i$: Priority order of different skills
q: Time discount factor (w discount window).

* * * * *